(12) United States Patent
Kim

(10) Patent No.: US 10,655,204 B2
(45) Date of Patent: May 19, 2020

(54) HOT PRESS FORMED ARTICLE HAVING GOOD ANTI-DELAMINATION, AND PREPARATION METHOD FOR SAME

(71) Applicant: POSCO, Pohang-si (KR)

(72) Inventor: Heung-Yun Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 116 days.

(21) Appl. No.: 15/576,525

(22) PCT Filed: Apr. 5, 2016

(86) PCT No.: PCT/KR2016/003513
§ 371 (c)(1),
(2) Date: Nov. 22, 2017

(87) PCT Pub. No.: WO2016/190538
PCT Pub. Date: Dec. 1, 2016

(65) Prior Publication Data
US 2018/0142337 A1 May 24, 2018

(30) Foreign Application Priority Data
May 26, 2015 (KR) .................. 10-2015-0072879

(51) Int. Cl.
*B32B 15/01* (2006.01)
*C23C 2/12* (2006.01)
(Continued)

(52) U.S. Cl.
CPC .................. *C23C 2/12* (2013.01); *B21B 1/38* (2013.01); *B32B 15/012* (2013.01);
(Continued)

(58) Field of Classification Search
None
See application file for complete search history.

(56) References Cited

U.S. PATENT DOCUMENTS 4,517,229 A   5/1985  Nickola et al.
4,624,895 A   11/1986 Nickola
(Continued)

FOREIGN PATENT DOCUMENTS

CN  103282532  9/2013
EP  1380666    1/2004
(Continued)

OTHER PUBLICATIONS

Chinese Office Action—Chinese Application No. 201680030486.0 dated Feb. 28, 2019, Fan Dong Wei, et al., and Dong Wei Fan, et al.
(Continued)

*Primary Examiner* — Daniel J. Schleis
(74) *Attorney, Agent, or Firm* — Cantor Colburn LLP

(57) ABSTRACT

Provided is a hot press formed article having good anti-delamination and having a hot dip aluminized layer formed on the surface of a base steel sheet. The base steel sheet comprises 0.18-0.25 wt % of C, 0.1-0.5 wt % of Si, 0.9-1.5 wt % of Mn, 0.03 wt % or less of P, 0.01 wt % or less of S, 0.01-0.05 wt % of Al, 0.05-0.5 wt % of Cr, 0.01-0.05 wt % of Ti, 0.001-0.005 wt % of B, 0.009 wt % or less of N and the balance of Fe and other impurities. The aluminized layer comprises a single soft diffusion layer comprising α-Fe with solid-solubilized Al, and the hardness of the diffusion layer is 300-600 (Hv).

5 Claims, 2 Drawing Sheets

(51) Int. Cl.
- *B21B 1/38* (2006.01)
- *C23C 2/28* (2006.01)
- *C23C 2/20* (2006.01)
- *C23C 10/22* (2006.01)
- *C22C 38/38* (2006.01)
- *C21D 8/02* (2006.01)
- *C21D 9/46* (2006.01)
- *C22C 38/00* (2006.01)
- *C22C 38/02* (2006.01)
- *C22C 38/04* (2006.01)
- *C22C 38/06* (2006.01)
- *C22C 38/28* (2006.01)
- *C22C 38/32* (2006.01)
- *C21D 1/673* (2006.01)

(52) U.S. Cl.
CPC ............ *C21D 8/0205* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C22C 38/38* (2013.01); *C23C 2/20* (2013.01); *C23C 2/28* (2013.01); *C23C 10/22* (2013.01); *C21D 1/673* (2013.01); *C21D 8/0273* (2013.01); *Y10T 428/12757* (2015.01)

(56) References Cited

U.S. PATENT DOCUMENTS

| | | | |
|---|---|---|---|
| 4,837,091 | A | 6/1989 | Nickola |
| 8,066,829 | B2 * | 11/2011 | Spehner .............. B21D 22/022 148/531 |
| 2004/0009366 | A1 | 1/2004 | Takagi et al. |
| 2009/0238715 | A1 | 9/2009 | Cho et al. |
| 2011/0165436 | A1 | 7/2011 | Drillet et al. |
| 2011/0300407 | A1 | 12/2011 | Cho et al. |
| 2012/0291510 | A1 | 11/2012 | Kim et al. |
| 2013/0177780 | A1 | 7/2013 | Park et al. |
| 2014/0030544 | A1 | 1/2014 | Maki et al. |

FOREIGN PATENT DOCUMENTS

| | | |
|---|---|---|
| EP | 2377965 | 10/2011 |
| EP | 2695963 | 2/2014 |
| EP | 2086755 | 11/2017 |
| JP | 02025982 | 6/1990 |
| JP | 05055594 | 8/1993 |
| JP | 06017559 | 3/1994 |
| JP | 2003193178 | 7/2003 |
| JP | 2003286557 | 10/2003 |
| JP | 2007291441 | 11/2007 |
| JP | 2007314874 | 12/2007 |
| JP | 2009263692 | 11/2009 |
| JP | 2009293078 | 12/2009 |
| JP | 2010018856 | 1/2010 |
| JP | 2010018860 | 1/2010 |
| JP | 2011512455 | 4/2011 |
| KR | 100878614 | 1/2009 |
| KR | 20090101684 | 9/2009 |
| KR | 20100047018 | 5/2010 |
| KR | 20100082537 | 7/2010 |
| KR | 20110076147 | 7/2011 |
| KR | 20130008657 | 1/2013 |
| KR | 20130132623 | 12/2013 |
| WO | 02103073 | 12/2002 |
| WO | 2009090555 | 7/2009 |

OTHER PUBLICATIONS

Japanese Office Action—Japanese Application No. 2017-561283 dated Feb. 5, 2019.

Fan, et al., Formation of an Aluminide Coating on Hot Stamped Steel, ISIJ International, vol. 50, 2010, pp. 1713-1718.

Fan, et al., State-of-the-Knowledge on Coating Systems for Hot Stamped Parts, Steel Research International, 2012, pp. 412-433.

Windmann, et al., Phase formation at the interface between a boron alloyed steel substrate and an Al-rich coating, Surface & Coatings Technology, 2013, pp. 130-139.

Wang, et al., The high-temperature oxidation behavior of hot-dipping Al—Si coating on low carbon steel, Surface & Coatings Technology, 2006, pp. 6601-6605.

European Search Report—European Application No. 16800178.2, dated May 18, 2018.

International Search Report—PCT/KR2016/003513 dated Jul. 25, 2016.

* cited by examiner

HOT PRESS FORMED ARTICLE HAVING GOOD ANTI-DELAMINATION, AND PREPARATION METHOD FOR SAME

TECHNICAL FIELD

The present disclosure relates to manufacturing of a hot press formed (HPF) article having good delamination resistance, and more particularly, to a hot press formed article having good delamination resistance through only a single soft diffusion layer being formed by controlling heat treatment conditions during an alloying heat treatment of a hot-dip aluminum plated steel sheet having a hot-dip aluminum plated layer on a surface; and a method of manufacturing the same.

BACKGROUND ART

Recently, various safety regulations for protecting passengers in automobiles have been strengthened. In addition, as one measure to improve the fuel efficiency of automobiles, improvements in the strength, along with the lightening of members used in automobiles are becoming important considerations.

Therefore, to this end, a hot press forming method is employed in the manufacturing of automobile parts. Regarding the hot press forming method, after a steel sheet is heated to a predetermined temperature (for example, a temperature at which a phase thereof is changed to an austenite phase) to lower strength, and the steel sheet is formed in a mold having a lower temperature (for example, room temperature) than that of the steel sheet, so formation is given. Simultaneously, quenching is carried out by using a temperature difference of both, so strength after forming is secured. Moreover, the hot press forming method has various names such as a hot forming method, a hot stamping method, a hot stamp method, a die quenching method and the like, in addition to a hot pressing method.

As described above, when hot press forming (for example, hot deep drawing) is performed using a mold, while a steel sheet is heated at a two-phase temperature of (an Ac1 transformation point to an Ac3 transformation point) or at a single-phase temperature of an Ac3 transformation point or more to be softened, forming starts. That is, in a state in which a steel sheet in a high temperature state is inserted into a gap between a die and a blank holder, the steel sheet is pushed into a hole of the die by a punch, and the steel sheet is formed to have a shape corresponding to an outer shape of the punch as an outer diameter of the steel sheet is reduced. Then, the punch and the die are cooled while forming is performed. Thus, while heat diffusion from the steel sheet to the mold and the die is performed, a material is further maintained at a bottom dead center of forming, so quenching of the material is performed. By performing such a forming method, it is possible to obtain a formed product with 1500 MPa having good dimensional accuracy. Moreover, forming load may be reduced as compared with a case of forming a part having the same strength class in the cold, so that the capacity of a press machine is able to be reduced.

The hot press forming method is widely used as a forming method not only capable of normally obtaining an ultrahigh strength product with 1000 MPa or more, but also of obtaining excellent dimensions and precision in products. In addition, a basic material thereof corresponds to a heat-treated steel having a composition system in which Ti and Cr are added in common based on a composition system of 22MnB5, i.e. 0.22% of C-1.2% of Mn-maximum 50 ppm of B, specified in EN standard, and is further hot plated with an aluminum alloy including 9 wt % to 10 wt % of Si, 2.0 wt % to 3.5 wt % of iron (Fe) in addition to aluminum.

However, generally, when a steel sheet hot-dip plated with an aluminum alloy is hot press formed, a thickness of a plated layer increases as the plated layer transforms into a large number of intermetallic compound layers. For example, the large number of intermetallic compound layers including Fe—Al-based oxides such as $Fe_3Al$, $FeAl$, $FeAl_2$, $Fe_2Al_5$, $FeAl_3$ and the like are formed in a direction from iron to a surface. These intermetallic compounds are largely divided into a diffusion layer and an alloy layer. Since the diffusion layer is soft and the alloy layer is hard, fracturing may occur at an interface between the diffusion layer and the alloy layer during hot press forming. As a result, a plated layer is delaminated, so the plated layer in the form of fine powder is stacked on a mold. In some cases, the fine powder adheres to the mold. Therefore, there are problems that various causes such as dimensional variations of a formed article, surface dent induction, mold correction, cutting, and the like may be provided and additional costs may be incurred.

Therefore, when an aluminum-plated steel sheet is employed for use in automobiles and the like, there is a continuing need for a method capable of suppressing cracking and delaminating of a plated layer after such hot press forming.

In detail, in Korea Patent Publication No. KR 2010-0082537, disclosed are a hot press formed product capable of suppressing crack propagation by increasing a ($Fe_3Al$+ $FeAl$) alloy phase layer, preventing crack propagation, and relatively reducing a $Fe_2Al_5$ layer, providing a cause of cracking, by optimizing conditions of a plating bath when a hot-rolled steel sheet or a cold-rolled steel sheet is manufactured as an aluminum plated steel sheet, and controlling a manufacturing process [a heating temperature and the heating time are controlled to a lower heating temperature and the shorter maintaining time than an aluminum plated steel sheet according to the related art] in an operation of manufacturing a hot press forming product; and a method of manufacturing the same. However, in the technique disclosed in the above-mentioned publication, there are limits that the formed alloy phase ($Fe_3Al$+$FeAl$) lacks crack prevention capability and an alloy layer is delaminated in the presence of a cracking alloy phase ($Fe_2Al_5$) layer. That is, delamination in the form of fine powder may still occur, causing problems such as mold adhesion, surface dent generation and the like.

Therefore, there is demand for development of a HPF article having excellent press formability, able to overcome the above-mentioned problems.

DISCLOSURE

Technical Problem

An aspect of the present disclosure may provide a hot press formed (HPF) article having good delamination resistance by only forming a soft single diffusion layer by controlling heat treatment conditions when a hot-dip aluminum plated steel sheet, having a hot-dip aluminum plated layer on a surface, is subjected to alloying heat treatment Further, an aspect of the present disclosure may provide a method of manufacturing the same.

However, problems sought to be resolved by the present disclosure are not limited to the above-described problems.

Other problems, which are sought to be resolved by the present disclosure but are not described herein, will be clearly understood by those skilled in the art from the descriptions below.

Technical Solution

According to an aspect of the present disclosure, a hot press formed (HPF) article has good delamination resistance and has a hot-dip aluminum plated layer formed on a surface of a base steel sheet, wherein the base steel sheet includes C: 0.18 wt % to 0.25 wt %, Si: 0.1 wt % to 0.5 wt %, Mn: 0.9 wt % to 1.5 wt %, P: 0.03 wt % or less, S: 0.01 wt % or less, Al: 0.01 wt % to 0.05 wt %, Cr: 0.05 wt % to 0.5 wt %, Ti: 0.01 wt % to 0.05 wt %, B: 0.001 wt % to 0.005 wt %, N: 0.009 wt % or less, a balance of Fe and other impurities; the plated layer only includes a single soft diffusion layer including α-Fe with solid-solubilized Al; and hardness of the diffusion layer is 300 (Hv) to 600 (Hv).

The base steel sheet may be a cold rolled steel sheet or a hot rolled steel sheet.

A thickness of the diffusion layer may be within a range of 2 μm to 40 μm, and more preferably, within a range of 2 μm to 10 μm.

The diffusion layer may include 1.0 wt % to 5.0 wt % of at least one of Si, Mn, or Al based on the diffusion layer.

The diffusion layer includes 0.2 wt % to 1.0 wt % of at least one of Cr, Mo, or Ti based on the diffusion layer.

The base steel sheet may additionally include 0.001% to 0.5% of Mo+W.

The base steel sheet may additionally include at least one of Nb, Zr, or V within a range of 0.001% to 0.4% (as the sum).

The base steel sheet may additionally include Cu+Ni within a range of 0.005% to 2.0%.

The base steel sheet may additionally include 0.03% or less of at least one of Sb, Sn, or Bi.

According to an aspect of the present disclosure, a method of manufacturing a hot press formed article having good delamination resistance includes: preparing a steel sheet having the same steel composition as described above; hot-dip aluminum plating the steel sheet, as the steel sheet is heated at a temperature of 550° C. to 850° C. and is maintained at 640° C. to 680° C., and the steel sheet is then immersed in a hot-dip aluminum plating bath in which a composition includes Si: 1 wt % to 11 wt %, Fe: less than 3 wt %, the balance of Al and other impurities; alloying a hot-dip aluminum plated layer on a surface, as the hot-dip aluminum plated steel sheet is heated at a temperature of 900° C. to 990° C. and is maintained for 20 minutes to 30 minutes; and manufacturing a HPF product by hot forming the hot-dip aluminum plated steel sheet having been alloyed while quenching the hot-dip aluminum plated steel sheet to a temperature range of 300° C. or less.

The plated layer having been alloyed may only include a single soft diffusion layer including α-Fe with solid-solubilized Al; and hardness of the diffusion layer may be 300 (Hv) to 600 (Hv).

The base steel sheet may be a cold rolled steel sheet or a hot rolled steel sheet.

A thickness of the diffusion layer may be within a range of 2 μm to 40 μm, and more preferably, within a range of 2 μm to 10 μm.

The diffusion layer may include 1.0 wt % to 5.0 wt % of at least one of Si, Mn, or Al by wt % based on the diffusion layer.

The diffusion layer may include 0.2% to 1.0% of at least one of Cr, Mo, or Ti by wt % based on the diffusion layer.

Advantageous Effects

According to an exemplary embodiment in the present disclosure, as a hot-dip aluminum plated layer, having been alloyed after an alloying heat treatment of a hot press forming process (HPF process), only includes a single diffusion layer including a soft α-Fe with solid-solubilized Al, a hot press formed (HPF) article having good delamination resistance after hot forming may be effectively provided.

BEST MODE FOR INVENTION

Figure 1:
FIG. 1 is a structural image of a longitudinal section of a plated layer of a plated steel sheet according to the related art of Comparative Example 2 during an experiment.

Hereinafter, exemplary embodiments of the present invention will be described.

First, a hot press formed article having good delamination resistance according to an exemplary embodiment will be described. A HPF article according to an exemplary embodiment has a structure in which a hot-dip aluminum plated layer is formed on a surface of a base steel sheet, and the base steel sheet includes C: 0.18 wt % to 0.25 wt %, Si: 0.1 wt % to 0.5 wt %, Mn: 0.9 wt % to 1.5 wt %, P: 0.03 wt % or less, S: 0.01 wt % or less, Al: 0.01 wt % to 0.05 wt %, Cr: 0.05 wt % to 0.5 wt %, Ti: 0.01 wt % to 0.05 wt %, B: 0.001 wt % to 0.005 wt %, N: 0.009 wt % or less, a balance of Fe and other impurities. A specific steel composition and reasons for limitations on contents thereof will be described in detail.

C: 0.18% to 0.25%

C is an essential element increasing the strength of martensite. If a C content is less than 0.18%, it may be difficult to obtain sufficient strength to secure impact resistance. Further, if the C content is greater than 0.25%, impact toughness of a slab may be deteriorated, and weldability of the HPF article may be deteriorated.

In this regard, in the present invention, it is preferable to limit the C content to 0.18 wt % to 0.25 wt % (hereinafter, denoted as %).

Si: 0.1% to 0.5%

Si is effective for improving the work hardenability of steel and homogenizing a material of the steel after hot press forming (HPF). If Si content is less than 0.1%, work hardenability, material homogenizing, and diffusion to a plated layer may be difficult. If the Si content is greater than 0.5%, it may be difficult to expect an effect due to addition and an increase in costs may be caused. In this regard, in the present invention, it is preferable to limit the Si content to being within a range of 0.1% to 0.5%.

Mn: 0.9% to 1.5%

Mn is added to secure hardenability of steel in the same manner as Cr, B and the like. If a Mn content is less than 0.9%, it may be difficult to secure sufficient hardenability, and bainite may be formed. Therefore, it may be difficult to secure sufficient strength. Further, if the Mn content is greater than 1.5%, costs of manufacturing a steel sheet may increase, and also bending properties of the HPF article may be remarkably deteriorated as the Mn is segregated inside the steel material. In this regard, in the present invention, it is preferable to limit the Mn content to being within a range of 0.9% to 1.5%.

P: 0.03% or Less (not Including 0%)

P is a grain boundary segregation element hindering many characteristics of the HPF article. Thus, it is preferable to have P present in as small an amount as possible. If P content is greater than 0.03%, bending properties, impact properties, weldability and the like, of the formed article, may be deteriorated. Thus, it is preferable to limit the upper limit of the content to 0.03%.

S: 0.01% or Less (not Including 0%)

S is an element present in steel as an impurity, and hindering bending properties as well as weldability, of the formed article. Thus, it is preferable for the S to be contained in as small an amount as possible. If a S content is greater than 0.01%, the bending properties and weldability of the formed article may be deteriorated. Thus, it is preferable to limit the upper limit of the content to 0.01%.

Al: 0.01% to 0.05%

Al is added for the purpose of deoxidation in steel making, in a similar manner to the Si. In order to achieve the purpose, Al is added in an amount of 0.01% or greater. If the content is greater than 0.05%, the effect thereof may be saturated, and the surface qualities of a plated material may be deteriorated. Thus, it may be preferable to limit the upper limit of the content to 0.05%.

Cr: 0.05% to 0.5%

Cr is added to secure hardenability of steel in the same manner as Mn, B and the like. If a Cr content is less than 0.05%, it may be difficult to secure sufficient hardenability. If the content is greater than 0.5%, sufficient hardenability can be secured. However, the characteristic may be saturated and also costs of manufacturing a steel material may increase. In this regard, in the present invention, it is preferable to limit the Cr content to being within a range of 0.05% to 0.5%.

Ti: 0.01% to 0.05%

Ti is added to form TiN by binding to nitrogen remaining in steel as an impurity, thereby leaving solid B essential to secure hardenability. If Ti content is less than 0.01%, it may be difficult to expect a sufficient effect. If the content is greater than 0.05%, the characteristic may be saturated and also costs of manufacturing a steel material may increase. In this regard, in the present invention, it is preferable to limit the Ti content to being within a range of 0.01% to 0.05%.

B: 0.001% to 0.005%

B is added to secure hardenability of the HPF article in the same manner as Mn and Cr. To achieve this purpose, B should be added in an amount of 0.001% or greater. If the content is greater than 0.005%, the effect thereof may be saturated, and also hot rolling properties may be remarkably reduced. Thus, in the present invention, it is preferable to limit the B content to being within a range of 0.001% to 0.005%.

N: 0.009% or Less

N is present in steel as an impurity, and is preferably to add the N in as small an amount as possible. If N content is greater than 0.009%, it may cause a surface defect of a steel material. Thus, it is preferable to limit the upper limit of the content to 0.009%.

Then, more preferably, a base steel sheet forming the HPF article of the present invention may further contain the following ingredients.

Mo+W: 0.001% to 0.5%

Mo and W are elements improving hardenability and precipitation hardening, and are significantly effective in further securing high strength. If the sum of addition amounts of the Mo and the W is less than 0.001%, it may be difficult to obtain a sufficient effect of improving hardenability and precipitation hardening. If the sum thereof is greater than 0.5%, the effect may be saturated and manufacturing costs may also increase. Thus, in the present invention, it is preferable to limit the Mo+W content to being within a range of 0.001% to 0.5%.

Sum of at Least One of Nb, Zr, or V: 0.001% to 0.4%

Nb, Zr and V are elements increasing strength of a steel sheet, and improving grain refinement and heat treatment characteristics. If a content of at least one of Nb, Zr and V is less than 0.001%, it may be difficult to expect the above effect. If the content is greater than 0.4%, manufacturing costs may increase excessively. Thus, in the present invention, it is preferable to limit the contents of the elements to a range of 0.001% to 0.4%.

Cu+Ni: 0.005% to 2.0%

Cu is an element improving strength by forming fine Cu precipitates, and Ni is an element effective to increase strength and improve heat treatment characteristics. If the sum of the above ingredients is less than 0.005%, it may difficult to obtain desired strength. If the sum thereof is greater than 2.0%, workability may be degraded, and manufacturing costs may increase. In this regard, in the present invention, it is preferable to control the Cu+Ni content to being within a range of 0.005% to 2.0%.

Sum of at Least One of Sb, Sn, or Bi: 0.03% or Less

Sb, Sn and Bi are grain segregation elements and during heating of the hot press forming (HPF), the elements are concentrated at an interface between a plated layer and base iron and can improve adhesion of the plated layer. The elements can serve to prevent the detachment of the plated layer during hot forming by improving adhesion of the plated layer. Because the Sb, Sn and Bi have similar characteristics, it is possible to use three elements as a mixture. In this case, the amount of at least one may preferably be 0.03% or less. If the sum of the above ingredients is greater than 0.03%, there may be a problem that brittleness of the base iron may be deteriorated during the hot forming.

A HPF article according to an exemplary embodiment has a hot-dip aluminum plated layer formed on a surface of a base steel sheet having the steel composition described above, and the plated layer may include only a single soft diffusion layer including α-Fe with solid-solubilized Al after alloying heat treatment.

According to the related art, regarding hot press forming (HPF), it is well known that a hot-dip aluminum plated layer is formed of a soft diffusion layer and a hard alloy layer such as a Fe2Al5 compound and a FeAlSi compound, after the alloying heat treatment. However, as illustrated above, the diffusion layer is soft and the alloy layer is hard. Thus, during hot press forming, a fracture occurs at an interface between the diffusion layer and the alloy layer, so a problem in which a plated layer is delaminated may occur.

Thus, in the present invention, in order to fundamentally solve a problem of delamination in a hot-dip aluminum plated layer, an alloying heat treatment temperature is controlled, so the plated layer only includes a single diffusion layer including α-Fe with solid-solubilized Al, rather than a mixed configuration of a soft layer and a hard layer. In addition, in this case, hardness of the diffusion layer may be within a range of 300 (Hv) to 600 (Hv).

In addition, in the present invention, the diffusion layer is preferable to include 1.0% to 5.0% of at least one of Si, Mn, or Al by wt % based on the diffusion layer.

In addition, the diffusion layer is preferable to include 0.2% to 1.0% of at least one of Cr, Mo, or Ti by wt % based on the diffusion layer.

Moreover, in the present invention, a thickness of the diffusion layer is preferably within a range of 2 μm to 40 μm, more preferably, within a range of 2 μm to 10 μm.

Next, a method of manufacturing a hot press formed (HPF) article having good delamination resistance according to an exemplary embodiment will be described.

A method of manufacturing a HPF article according to an exemplary embodiment includes: preparing a steel sheet having the steel composition described above; hot-dip aluminum plating the steel sheet, as the steel sheet is heated at a temperature of 550° C. to 850° C. and is maintained at 640° C. to 680° C., and the steel sheet is then immersed in a hot-dip aluminum plating bath in which a composition includes Si: 1 wt % to 11 wt %, Fe: less than 3 wt %, the balance of Al and other impurities; alloying a hot-dip aluminum plated layer on a surface, as the hot-dip aluminum plated steel sheet is heated at a temperature of 900° C. to 990° C. and is maintained for 20 minutes to 30 minutes; and manufacturing a HPF product by hot forming the hot-dip aluminum plated steel sheet having been alloyed while quenching the hot-dip aluminum plated steel sheet to a temperature range of 300° C. or less.

First, in the present invention, a steel sheet having the composition described above is prepared. In the present invention, the steel sheet may be a hot-rolled steel sheet or a cold-rolled steel sheet.

Then, in the present invention, the steel sheet is heated at a temperature of 550° C. to 850° C., and is then maintained at 640° C. to 680° C., and the steel sheet is immersed in a hot-dip aluminum plating bath, in which a composition includes Si: 1 wt % to 11 wt %, Fe: less than 3%, the balance of Al and other impurities, to be hot-dip aluminum plated.

First, the steel sheet is heated at 550° C. to 850° C. in an annealing furnace. The purpose of annealing a steel sheet is to make the steel sheet hardened by cold rolling easy to process, rather than to secure final material properties. If an annealing temperature is less than 550° C., the steel sheet may be difficult to process due to a hardened structure. Thus, dimension variations may occur during cutting or forming. On the other hand, when the annealing temperature is greater than 850° C., it is not appropriate due to deterioration of a heating apparatus and waste of thermal energy.

In addition, the steel sheet having been heated is immersed in a hot-dip aluminum plating bath to be hot-dip aluminum plated. In this case, a temperature of the plating bath is preferably within a range of 640° C. to 680° C. The temperature of the plating bath is set in consideration of phase transformation of molten aluminum. It is preferable to maintain a molten state during plating, and it is preferable to quickly transform a phase to a solidified state after molten plating. However, if a temperature of the hot-dip aluminum plating bath is less than 640° C., an aluminum plating bath is locally solidified within a port, and an aluminum plated layer plated on a steel sheet is solidified early, plating quality may be deteriorated. On the other hand, when the temperature of a plating bath is greater than 680° C., a port of the plating bath is quickly eroded, so it is not appropriate.

Meanwhile, in the present invention, a composition of the hot-dip aluminum plating bath preferably includes 1 wt % to 11 wt % of Si, less than 3 wt % of Fe, a balance of aluminum and other impurities. In the present invention, a Si ingredient in the hot-dip aluminum plating bath is involved in alloying of a steel sheet and a plated layer during manufacturing of an aluminum plated steel sheet and high-temperature forming heat treatment. If Si content is less than 1%, an alloy layer in an aluminum plated steel sheet is formed to be thick. Thus, when cutting and blanking are performed, a plated layer may be delaminated. On the other hand, when the Si content is greater than 11%, there may be a problem that a single diffusion layer is not obtained due to a delay in alloying.

In addition, in the present invention, after the hot-dip aluminum plated steel sheet is cooled, skin pass rolling (SPM) may be performed at elongation of 0.5% to 3%.

Then, in the present invention, after the hot-dip aluminum plated steel sheet is heated at a temperature of 900° C. to 990° C., the hot-dip aluminum plated steel sheet is maintained for a certain period of time to alloy a hot-dip aluminum plated layer on a surface.

In other words, the aluminum plated steel sheet is charged into a heating furnace having an atmosphere temperature of 900° C. to 990° C., and is heat-treated at 900° C. to 990° C. The atmosphere temperature of the heating furnace may not match a temperature of the steel sheet having been charged, and a key factor is a temperature of the steel sheet. However, it is convenient to adjust the ambient temperature rather than directly controlling a temperature of a steel plate. If a temperature of a steel sheet is less than 900° C., when the steel sheet is heated for a short time, an alloy layer is not generated. If the temperature of a steel sheet is less than 900° C., when the steel sheet is heated for a long time, a two-layer structure, including a diffusion layer and an alloy layer, may be obtained, and there may be a problem in which the alloy layer is delaminated during processing. In addition, if a heating temperature is high, energy waste may be generated and deterioration of heating furnace equipment may occur. Thus, the temperature of a steel sheet is preferably less than 990° C.

Meanwhile, the heating time is a dependent variable of a heating temperature, and sufficient time is required to allow a plated layer to only include the single soft diffusion layer described above. In the present invention, the total heating time is 2 minutes to 30 minutes. If the total heating time is less than 2 minutes, there may be a problem that a single diffusion layer is not generated. If the total heating time exceeds a maximum of 30 minutes, homogenization of an austenite structure may be saturated, and generation of a single diffusion layer may also be saturated. In addition, if the total heating time exceeds 30 minutes, there may be a problem that productivity is reduced.

Due to high-temperature heat treatment as described above, a hot-dip aluminum plated layer formed on a surface of a steel sheet is alloyed. In the present invention, as described above, an alloying heat treatment temperature is controlled, so the plated layer may be provided to only include a single diffusion layer including α-Fe with solid-solubilized Al, rather than a mixed configuration of a soft layer and a hard layer. Moreover, in this case, hardness of the diffusion layer is preferably 300 (Hv) to 600 (Hv).

In addition, in the present invention, it is preferable for the diffusion layer to include 1.0% to 5.0% of at least one of Si, Mn, or Al by wt % based on the diffusion layer.

In addition, it is preferable for the diffusion layer to include 0.2% to 1.0% of at least one of Cr, Mo, or Ti by wt % based on the diffusion layer.

Moreover, in the present invention, a thickness of the diffusion layer is preferably within a range of 2 μm to 40 μm, and more preferably, within a range of 2 μm to 10 μm.

In addition, the transfer time of the steel sheet having been heated from a heating furnace to a mold is preferably within 20 seconds. In this regard, if the transfer time exceeds 20 seconds, a temperature of a steel sheet falls may below a ferrite transformation start temperature, and desired strength may not be secured. The transfer time is more preferably within 12 seconds.

Subsequently, in the present invention, while a hot-dip aluminum plated steel sheet having been alloyed is hot formed, the hot-dip aluminum plated steel sheet is quenched to a temperature within a range of 300° C. or less, so a HPF product is manufactured.

In other words, the steel sheet, having been alloyed, is formed using a press-forming mold allowing an interior thereof to be water-cooled. After a temperature of a steel sheet becomes 300° C. or less, a formed article is removed from the mold, and hot press forming (HPF) is completed. After hot pressing, while a temperature of a steel sheet is 300° C. or more, if the formed article is removed from the mold, deformation caused by thermal stress may occur.

MODE FOR INVENTION

Hereinafter, the present disclosure will be described in greater detail with reference to examples.

Example

Cold rolled steel sheets, including C: 0.24 wt %, Si: 0.264 wt %, Mn: 1.29 wt %, P: 0.013 wt %, S: 0.0014 wt %, Al: 0.041 wt %, Cr: 0.129 wt %, Ti: 0.032 wt %, B: 0.0024 wt %, N: 0.0038 wt %, a balance of Fe and other impurities, were prepared. The steel sheets having been prepared passed through a continuous hot-dip plating line and hot-dip aluminum plating was performed. In addition, in this case, first, alkali degreasing was performed and heating was performed at a heating temperature, 800° C. for the total heating time, 6 minutes. Then, the steel sheets were cooled at 660° C., and were then immersed in a hot-dip aluminum plating bath of which temperature is 660° C., so hot-dip aluminum plating was performed to allow a plating adhesion quantity to be satisfied with a range of 5 μm to 40 μm. The plating bath included 1 wt % to 11 wt % of Si, Fe, and a balance of aluminum and other impurities.

The hot-dip aluminum plated steel sheets, having been manufactured, were hot press formed. In this case, a steel sheet was heat-treated for the total heating time, 2 minutes to 30 minutes, in a heating furnace of which temperature was 700° C. to 990° C. Then, the steel sheet was moved to a water cooling mold during 3 seconds, press forming was performed, and the steel sheet was maintained for 10 seconds and then blown-out. A sectional structure of an alloy layer of the hot press formed articles, having been manufactured in the operation described above, was analyzed and a result thereof is illustrated in Table 1. Moreover, through a 3 point bending test, delamination resistance of the formed articles having been manufactured was evaluated and a result thereof is illustrated in Table 1. In addition, hardness of a plated layer (an alloy layer) for each formed article was measured and is also illustrated in Table 1. Here, the hardness refers to a Vickers (Hv, 1 g) hardness value measured under a condition of a load of 1 g using a micro hardness tester.

In addition, in Table 1, regarding evaluation of delamination resistance of an alloy layer, a 3 point bending test device was used to allow an inner angle to be 30 degrees. Then, tape was attached to an inside and was then detached. Thereafter, a delamination state was evaluated by a degree to which the tape was smeared with a delamination piece. In detail, the delamination state was evaluated as illustrated below.

[Delamination Resistance Evaluation Legend]
○: There was no delamination, so tape was not smeared with delamination pieces
▲: Some delamination occurred and tape was smeared with some delamination pieces
X: Delamination occurred, so tape was smeared with delamination pieces

TABLE 1

| Classification | Plating bath ingredient (wt %) | | Cooling rate after plating (° C./s) | Heat treatment condition | | Delamination resistance | Plated layer | | Plated layer hardness |
|---|---|---|---|---|---|---|---|---|---|
| | | | | | | | configuration | | |
| | Si | Fe | | Heating temperature (° C.) | Heating time (s) | | Diffusion layer | Alloy layer | |
| Inventive Example 1 | 11 | 2 | 30 | 990 | 2 | ○ | Presence | Absence | 602 |
| Inventive Example 2 | 11 | 2 | 30 | 990 | 10 | ○ | Presence | Absence | 522 |
| Comparative Example 1 | 8 | 2 | 30 | 980 | 2 | x | Presence | Presence | 918 |
| Comparative Example 2 | 8 | 2 | 30 | 930 | 5 | x | Presence | Presence | 954 |
| Inventive Example 3 | 8 | 2 | 30 | 980 | 10 | ○ | Presence | Absence | 451 |
| Inventive Example 4 | 8 | 2 | 30 | 900 | 30 | ○ | Presence | Absence | 546 |
| Inventive Example 5 | 1 | 0.2 | 30 | 980 | 2 | ○ | Presence | Absence | 476 |
| Inventive Example 6 | 1 | 0.2 | 30 | 900 | 30 | ○ | Presence | Absence | 502 |

TABLE 1-continued

| Classification | Plating bath ingredient (wt %) | | Cooling rate after plating (° C./s) | Heat treatment condition | | Delamination resistance | Plated layer configuration | | Plated layer hardness |
|---|---|---|---|---|---|---|---|---|---|
| | Si | Fe | | Heating temperature (° C.) | Heating time (s) | | Diffusion layer | Alloy layer | |
| Comparative Example 3 | 1 | 0.2 | 30 | 700 | 2 | ▲ | Absence | Absence | 205 |
| Inventive Example 7 | 1 | 0.2 | 30 | 990 | 30 | ○ | Presence | Absence | 300 |

* In Table 1, a diffusion layer refers to a single soft diffusion layer including α-Fe with solid-solubilized Al, and an alloy layer is a hard alloy layer including an Fe2Al5 compound and an FeAlSi compound.

Figure 3:
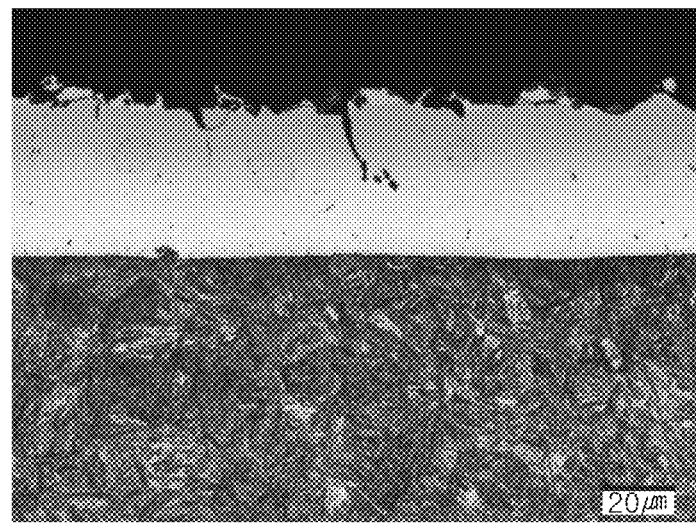
FIG. 3 is an image of a longitudinal section of a plated layer of a steel sheet after hot press forming (HPF) according to an exemplary embodiment (Inventive Example 1).
Figure 4:
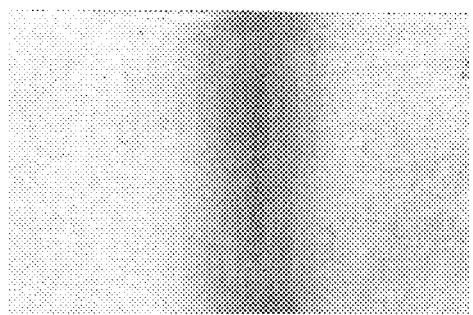
FIG. 4 is an image illustrating a delamination resistance evaluation result in a case of FIG. 3.

As illustrated in Table 1, in the case of Inventive Examples 1 to 7, a plated layer only includes a single soft diffusion layer including α-Fe with solid-solubilized Al, so it is confirmed that delamination resistance was excellent. FIGS. 3 and 4 illustrate evaluation of a longitudinal structure and delamination resistance with respect to a formed article of Inventive Example 1 of Table 1, respectively. As illustrated in FIG. 3, it is confirmed that an alloy layer was a diffusion layer having a single phase. As illustrated in FIG. 4, it is confirmed that delamination did not occur at all.

Figure 2:
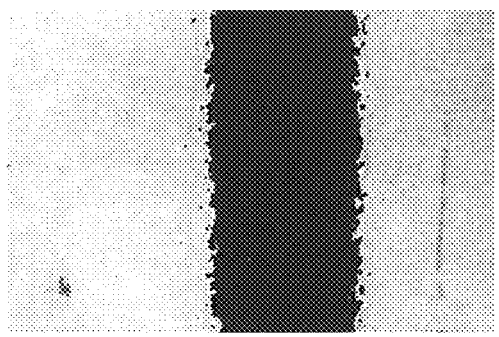
FIG. 2 is an image illustrating a delamination resistance evaluation result in a case of FIG. 1.

Meanwhile, FIGS. 1 and 2 illustrate evaluation of a longitudinal structure and delamination resistance with respect to a formed article of Comparative Example 2, respectively. As illustrated in FIG. 1, it is confirmed that an alloy layer included a mixture of a diffusion layer and a hard layer. Thus, as illustrated in FIG. 2, it is confirmed that a large amount of delamination occurred. In FIG. 2, a portion, which is black in the middle, is a delaminated material.

Moreover, as illustrated in Table 1, in the case of Comparative Examples 1 and 2, due to a two layer structure having a diffusion layer and an alloy layer, Vicker's hardness thereof was much higher than 600 (Hv). In the case of Comparative Example 3, alloying did not proceed, so there may be problems that hardness was less than 300 (Hv) and martensite was not stably generated.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A hot press formed (HPF) article having an improved delamination resistance, the HPF article comprising:
   a base steel sheet comprising: carbon (C): 0.18 wt % to 0.25 wt %, silicon (Si): 0.1 wt % to 0.5 wt %, manganese (Mn): 0.9 wt % to 1.5 wt %, phosphorous (P): 0.03 wt % or less, sulfur (S): 0.01 wt % or less, aluminum (Al): 0.01 wt % to 0.05 wt %, chromium (Cr): 0.05 wt % to 0.5 wt %, titanium (Ti): 0.01 wt % to 0.05 wt %, boron (B): 0.001 wt % to 0.005 wt %, nitrogen (N): 0.009 wt % or less, a balance of iron (Fe) and other impurities; and
   an aluminum plated layer formed on a surface of the base steel sheet,
   wherein the aluminum plated layer comprises: only a single soft diffusion layer comprising α-Fe and aluminum (Al) solid-solubilized in the α-Fe; and
   the single soft diffusion layer has a hardness of 300 (Hv) to 600 (Hv).

2. The hot press formed article of claim 1, wherein the single soft diffusion layer has a thickness within a range of 2 μm to 40 μm.

3. The hot press formed article of claim 2, wherein the thickness is within a range of 2 μm to 10 μm.

4. The hot press formed article of claim 1, wherein the single diffusion layer includes 1.0 wt % to 5.0 wt % of at least one of silicon (Si), manganese (Mn) and aluminum (Al) based on the single diffusion layer.

5. The hot press formed article of claim 1, wherein the single diffusion layer includes 0.2 wt % to 1.0 wt % of at least one of chromium (Cr), molybdenum (Mo) and titanium (Ti) based on the single diffusion layer.

* * * * *